United States Patent [19]
Nishimura et al.

[11] Patent Number: 5,955,134
[45] Date of Patent: Sep. 21, 1999

[54] PROCESS FOR PRODUCING SOYBEAN MILK AND OKARA

[75] Inventors: Takashi Nishimura, Kaizuka; Shushi Nagaoka; Hideo Sugano, both of Sennan-gun; Haruo Tsumura, Kobe, all of Japan

[73] Assignee: Fuji Oil Company, Limited, Osaka-fu, Japan

[21] Appl. No.: 09/066,667

[22] Filed: Apr. 28, 1998

[30] Foreign Application Priority Data

May 1, 1997 [JP] Japan ................................. 9-113752

[51] Int. Cl.$^6$ ................................. A23L 1/28; A23L 1/20; A01J 1/00
[52] U.S. Cl. ..................... 426/489; 426/518; 426/519; 426/634; 426/495
[58] Field of Search ..................... 426/634, 518, 426/519, 489, 495

[56] References Cited

U.S. PATENT DOCUMENTS

| | | |
|---|---|---|
| 3,728,327 | 4/1973 | Frazeur et al. . |
| 3,901,978 | 8/1975 | Nelson et al. ........................ 426/565 |
| 3,981,234 | 9/1976 | Nelson et al. ........................ 426/507 |
| 4,039,696 | 8/1977 | Marquardt et al. ................... 426/598 |
| 4,041,187 | 8/1977 | Nelson et al. ........................ 426/598 |
| 4,828,869 | 5/1989 | Doi et al. ............................. 426/656 |
| 4,902,526 | 2/1990 | Sudo et al. ........................... 426/598 |

FOREIGN PATENT DOCUMENTS

| | | |
|---|---|---|
| 0287081 | 10/1988 | European Pat. Off. . |
| 2366798 | 5/1978 | France . |
| 2578396 | 9/1986 | France . |

OTHER PUBLICATIONS

Patent Abstracts of Japan, vol. 011, No. 185 (C–428), Jun. 13, 1987 & JP 62 011068 A (Seikenshiya:KK; others:01), Jan. 20, 1987.

Patent Abstracts of Japan, vol. 009, No. 074 (C–273), Apr. 3, 1985 & JP 59 205957 A (Meiji Niyuugiyou KK), Nov. 21, 1984.

Patent Abstracts of Japan, vol. 011, No. 018 (C–398), Jan. 17, 1987 & JP 61 192256 A (World Food KK), Aug. 26, 1986.

*Primary Examiner*—Anthony J. Weier
*Attorney, Agent, or Firm*—Wenderoth, Lind & Ponack, L.L.P.

[57] ABSTRACT

A process for preparing soybean milk and okara, in particular, relating to improvement in pulverization of impregnated soybeans. The process includes carrying out pulverization of impregnated soybeans by the steps of cutting the impregnated soybeans with a device having rotating blade(s) to provide particles having an average diameter of less than about 100 $\mu$m; grinding the obtained soybean particles with a device which exerts frictional shearing stress to provide an aqueous soybean slurry; and separating the water-soluble portion of the slurry from the water-insoluble portion to provide soybean milk and okara. The soybean milk and okara obtained possess a pleasant flavor and mild taste.

3 Claims, No Drawings

PROCESS FOR PRODUCING SOYBEAN MILK AND OKARA

FIELD OF INVENTION

The present invention relates to a process for producing soybean milk and okara.

DESCRIPTION OF RELATED ART

The traditional process for producing tofu (bean curd) includes the steps of soaking soybeans in water for one night to impregnate them with water, pulverizing the impregnated soybeans in the presence of water to provide an aqueous slurry and separating the water soluble portion, i.e. soybean milk, from the water insoluble portion, i.e. okara, by means, such as wringing with filter cloth. The obtained soybean milk is further processed to provide tofu. In addition, soybean milk and okara are also used as they are as healthy foods and the like, or used as raw materials for processed foods.

Later, in order to improve the taste and flavor of soybean milk and okara, there were developed some improved processes including steps such as that of inactivating enzymes by heating the soybeans before soaking in water, that of soaking the soybeans in warm or hot water instead of cold water, and that of boiling or steaming of the soybeans. In such processes, the obtained impregnated soybeans were pulverized to provide an aqueous slurry, then the water-soluble portion of the slurry was separated from the water insoluble portion, okara, to provide soybean milk.

In the conventional processes, the step of pulverizing the impregnated soybeans was carried out by means of only frictional shearing stress exerted by means such as a MICOLLIDER or homogenizer. As a result of such treatment, frictional heat is generated and the cell walls of the soybeans are crushed. It is suggested that a substantial portion of the water insoluble fiber component of the soybeans, which mainly came from cell walls, is eluted into the soybean milk and causes an unpleasant taste and flavor, that the frictional heat may cause denaturation of the soybean proteins, and that soybean enzymes may be activated to generate an unpleasant flavor.

In order to improve the flavor and taste of the soybean milk, some improvements have been proposed for the pulverizing step. For example, JP-A 59-205957 disclosed a process comprising multiple phase grinding of impregnated soybeans under heating with direct steam at 80–100° C. This process contains the steps of grinding the impregnated soybeans with a grinder, and further grinding the soybeans with a hammer mill. There was no description that a device having rotating blades was used for the first pulverizing step. JP-A 62-11068 disclosed a process for preparing soybean milk which comprises the steps of grinding enzyme inactivated impregnated soybeans roughly into particles of 40-mesh or coarser, then grinding the soybean particles finely into particles of 80-mesh or finer. In addition, the obtained okara fiber may be further ground into ultra fine particles. In this prior art, MICROGREATER, a device which can exert shearing stress, was used for the first rough grinding step and ULTRAMIZER, a device which grinds materials by means of impact stress, was used for the second fine grinding step. JP-A 61-242553 disclosed a process for preparing soybean milk which comprises the steps of grinding enzyme inactivated impregnated soybeans in the presence of hot or warm water roughly, and then finely. However, the details of the process are not shown.

OBJECTS OF THE INVENTION

The main object of the present invention is to provide a process for producing soybean milk and okara with pleasant flavor and mild taste.

This object as well as other objects and advantages of the present invention will become apparent to those skilled in the art from the following description.

SUMMARY OF THE INVENTION

The present inventors have studied pulverization conditions of impregnated soybeans to obtain soybean milk and okara with peasant flavor and mild taste. As a result, it has been found that the desired soybean milk and okara can be obtained by carrying out pulverization of impregnated soybeans first with a device having rotating blade(s) to obtain particles having a certain particle size and then with a device which exerts frictional shearing stress to obtain particles having a finer particle size. Thus, the present invention has been completed.

That is, the present invention provides a process for producing soybean milk and okara which comprises carrying out pulverization of impregnated soybeans by the steps of:

cutting the impregnated soybeans with a device having rotating blade(s) to provide particles having an average diameter of less than about 100 μm, grinding the obtained soybean particles with a device which exerts frictional shearing stress to provide an aqueous soybean slurry, and separating the water-soluble portion of the slurry from the water-insoluble portion to provide soybean milk and okara.

In the present invention, the average size of the soybean particles obtained in the cutting step is less than about 100 μm, preferably, about 20–100 μm, more preferably, about 30–70 μm. The average particle size of the soybean particles obtained in the grinding step may be about 15–40 μm, preferably, about 20–30 μm. According to the present invention, the cutting and/or grinding operations may preferably be effected twice or more.

Thus, in the present invention, soybeans are pulverized by a two step process consisting of cutting with a device having rotating blades and grinding by means of frictional shearing stress to provide an aqueous slurry.

DETAILED DESCRIPTION OF THE INVENTION

In the present invention, the production steps per se may be those of conventional steps for producing soybean milk and okara.

Soybeans used for producing soybean milk and okara may be any kind of soybean that is conventionally used for producing tofu, soybean milk or okara. Defatted, dehypocotyled and dehulled soybeans are preferable. In order to dehypocotyl and dehull the soybeans, any conventional manner can be employed, for example, soybeans may be heated at over 70° C., preferably 70° C.–90° C. to dry them and then broken into 2 to 4 pieces.

Soybeans are soaked in water to be impregnated with water. Preferably, the impregnated soybeans contain about 50 wt % of water. The water may be cold, warm or hot water. Hot water is preferable. The soaking time may vary depending on the temperature of the water, i.e. the higher the temperature, the shorter the soaking time.

The impregnated soybeans are pulverized into particles. According to the present invention, the impregnated soybeans may be pulverized together with water used for the soaking. However, it is preferable for pleasant flavor to separate and remove the hot water-soluble portion eluted in the hot soaking water (mainly glycosides) from the impregnated soybeans before pulverization. In order to separate and remove the hot-water soluble portion, the soaking water may be just separated from the soybeans. The removed water may be further treated by passing through an ultrafiltration membrane or reverse-osmotic presser filtration membrane, and the filtrate may be reused for the pulverizing steps.

The impregnated soybeans obtained as above are subjected to the first pulverizing step, i.e. the cutting step. In this step, the soybeans are cut with a device having rotating blade(s), which can cut the soybeans into particles of less than about 100 $\mu$m. According to this step, soybeans are cut into particles having an average diameter of less than about 100 $\mu$m, preferably about 30–70 $\mu$m. Any device having high speed rotating edged blade(s) which can cut the impregnated soybeans into particles having an average diameter of less than about 100 $\mu$m may be employed for the cutting this step of the present invention. An example of such a device includes COMITROL (trade name). In order to adjust the particle size, it is preferable to increase the number of blades of the device or to effect the cutting operation twice or more with devices having a different number of blades. A device with fewer blades or with duller edge blades is unsuitable for the present invention because it cannot provide particles of the desired particle size. Therefore, the conventional cutter mill or line mill, which has rotating blades which can cut materials but has fewer blades and less speed of rotation, is not preferable.

By employing a device with an increased number of sharp edged high speed rotating blades in the cutting step of the present invention, the cell walls of the impregnated soybeans are cut very smoothly without being crushed. Therefore, the obtained soybean particles are expected to show increased extractability of soybean protein into the soybean milk. Especially, when the soybeans are treated with hot water for improvement of taste, the soybean proteins are denaturated and resist to being extracted into soybean milk, and the process of the present invention is effective to increase protein extractability into the soybean milk.

Because of being cut sharply, the soybean particles obtained in the cutting step have a sharpened edge, which may cause a stimulating taste of the resulting soybean milk and okara. Therefore, it is preferable, for mild taste of the soybean milk and okara, that further grinding the soybean particles by means of frictional shearing stress be conducted to provide spherical shaped particles.

Accordingly, the obtained soybean particles are further ground in the second pulverizing step. According to the grinding step of the present invention, the soybean particles, obtained in the cutting step, are ground more finely by means of frictional shearing stress. The term "frictional shearing stress" means in this specification and claims that shearing stress generated by frictional force. In the grinding step, any device that can generate frictional shearing stress and can provide particles having a size of less than 40 $\mu$m may be employed. For example, a MICOLLOIDER and a homogenizer may be employed in the grinding step of the present invention. Preferably, a homogenizer, more preferably, a high-pressure homogenizer is employed. In case the particle size of the pulverized soybeans obtained in the cutting step is relatively large, a low pressure homogenizer, such as one which exerts pressure of under 150 kg/cm$^2$ is not preferable since it requires many grinding operations to obtain particles of the desired size. Too many such operations may cause an unpleasant flavor of the resulting soybean milk and okara. The pressure exerted by the high-pressure homogenizer may be about 100–400 kg/cm$^2$, preferably, about 150–200 kg/cm$^2$. In case the pressure is too high, the particle size of the obtained aqueous soybean slurry becomes too small to separate the okara and soybean milk effectively.

According to the present invention, it is preferable to effect the grinding operation twice or more. By effecting frictional shearing stress more than two times, the distribution range of the particles will be narrower. Because of the narrower particle range, okara and soybean milk may be separated effectively to provide an improved flavor for both the soybean milk and okara. An average particle size of the soybean slurry obtained by the grinding step may be about 15–40 $\mu$m, preferably, about 20–30 $\mu$m. After the grinding step, the water-insoluble portion, i.e. okara, of the aqueous slurry is separated from the water-soluble portion, i.e. soybeanmilk. The separation may be effected by a batch process, which contains a step of wringing the aqueous slurry with a filter cloth, or by continuous method such as centrifugation. A continuous process is preferable as an industrial process. In order to increase the yield of soybean milk and okara, centrifugation of more than two times is preferable.

Soybean milk obtained by the present process contains a relatively high amount of glucose but a low amount of uronic acid (galacturonic acid). That means the soybean milk of the present invention contains a smaller amount of pectin like polysaccharides. To the contrary, soybean milk obtained by a conventional process, in which the impregnated soybeans are pulverized by means of only frictional shearing stress, contains a relatively high amount of galactose or arabinose but a low amount of glucose. Such a rich pectin or hemicellulose like polysaccharides may come from the crushed cell walls of the soybeans and may cause an unpleasant taste of the resulting soybean milk. According to the present invention, by cutting the impregnated soybeans in the first pulverizing step, elution of pectin like polysaccharides, the main component of the cell wall, into the soybean milk is effectively reduced.

Okara obtained according to the present invention provides a pleasant flavor with a mild and creamy taste.

The following examples further illustrate the present invention but are not to be construed to limit the scope of the present invention. Any variation may be made by one skilled in the art without departing from the spirit and scope of this invention.

EXAMPLE 1

One part by weight of dehulled and dehypocotyled soybeans were soaked in 10 parts by weight of water at a temperature of 30–50° C. for more than 60 minutes. A mixture of one part by weight of soybeans impregnated with water (water content was 40–50 wt %) and three parts by weight of hot water (90° C.) was cut twice with COMITROL (URSCHEL), which had rotating blades. The obtained aqueous soybean slurry contained soybean particles of 30–70 $\mu$m.

The obtained slurry was further ground twice with a high-pressure homogenizer (APV Co.) at 200 kg/cm$^2$ for 2 minutes to provide an aqueous slurry containing soybean particles of 20–30 $\mu$m (designated as "CH").

For comparative examples, the mixture of water and the impregnated soybeans as above was ground with only COMITROL, which had rotating blades to provide an aqueous soybean slurry having soybean particles of 20–30 $\mu$m (designated as "C"), or with only MASUCOLLOIDER (MASUKO SANGYO KABUSHIKI KAISHA, JAPAN), a device which grinds a material by means of frictional shearing stress and the clearance of which was adjusted to provide the desired particle size, to provide an aqueous soybean slurry containing soybean particles of 20–30 μm (designated as "M").

Each of the slurries was centrifuged at 3,000 G for 5 minutes to separate soybean milk and okara. The particle size of the slurry, weight ratio between the soybean milk and the okara, % by weight of dried solid content of the slurry, the soybean milk and the okara, and protein yield of the soybean milk were determined. The particle size was determined COULTER counter (Coulter Co.) The results are shown in Table 1:

TABLE 1

| Pulverizing operation | Particle size of the slurry (μm) | Dried solids content of the slurry (%) | Weight ratio soybean milk: okara |
| --- | --- | --- | --- |
| CH | 25 | 10.1 | 81:19 |
| C | 25 | 10.1 | 76:24 |
| M | 25 | 10.0 | 74:54 |

| Pulverizing operation | Dried solids content of the soybean milk (%) | Dried solids content of the okara (%) | Protein yield of the soybean milk (%) |
| --- | --- | --- | --- |
| CH | 8.4 | 16.3 | 79.0 |
| C | 8.3 | 15.8 | 72.6 |
| M | 8.2 | 15.4 | 71.1 |

The taste of the soybean milk was evaluated and compared by panelists. Twelve of twelve panelists rated the soybean milk obtained by the present invention (CH) as being better than the "C" or "M" soybean milk since the "CH" soybean milk had less soybean odor, grassy smell or stimulating smells than the others.

EXAMPLE 2

In order to clarify the effects of the present invention for the taste, flavor and protein yield of the soybean milk, an example was carried out using heat treated soybeans. Heat treatment of soybean causes denaturation of the protein contained in it and a reduction of protein extraction.

One part by weight of the dehulled and dehypocotyled soybeans were soaked in 8 parts by weight of water at 90° C. until the soybeans are sufficiently impregnated with water. One part by weight of the impregnated soybeans was mixed with 3 parts by weight of hot water (90° C.) and the mixture was roughly cut with COMITROL (URSCHEL) which has 170 rotating blades, and then with COMITROL which has 206 rotating blades to provide a slurry containing particles of 30–70 μm. The obtained slurry was then ground twice with a high-pressure homogenizer (APV Co.) at 200 kg/cm² to provide a finely divided soybean slurry containing particles of 20–30 μm (designated as "CH"). In comparative examples, the impregnated soybeans were cut with COMITROL, which has 222 rotating blades to provide a slurry containing particles of 20–30 μm (designated as "C"); or the impregnated soybeans were ground only with MASUCOLLOIDER (MASUKOU SANGYOU SYA, Japan), a device which grinds a material by means of frictional shearing stress, to provide a slurry containing particles of 20–30 μm (designated as "M"). The particle size was determined with COULTER counter. The results are shown in Table 2.

TABLE 2

| Pulverizing operation | Particle size of the slurry (μm) | Dried solids content of the slurry (%) | Weight ratio soybean milk: okara |
| --- | --- | --- | --- |
| CH | 25 | 10.1 | 75:25 |
| C | 25 | 10.1 | 69:31 |
| M | 25 | 10.0 | 46:54 |

| Pulverizing operation | Dried solids content of the soybean milk (%) | Dried solids content of the okara (%) | Protein yield of the soybean milk (%) |
| --- | --- | --- | --- |
| CH | 8.4 | 13.7 | 73.5 |
| C | 7.8 | 13.8 | 62.8 |
| M | 4.8 | 12.7 | 27.1 |

Soybean milk obtained from heat-treated soybeans, which were pulverized with only COMITROL or MASUCOLLOIDER were shown to yield less protein. Especially, the protein yield of the soybean milk obtained by pulverizing with only MASUCOLLOIDER was low.

The taste of the obtained soybean milk was evaluated and compared by panelists.

Twelve of twelve panelists rated the soybean milk obtained by the present invention (CH) as being better than the "C" or "M" soybean milk since the "CH" soybean milk had less soybean odor, grassy smell or stimulating smells than the others. Evaluations of flavor and taste of the soybean milk are shown in Table 3:

TABLE 3

| Pulverizing treatment | Flavor | Taste |
| --- | --- | --- |
| CH | ⊚ | ⊚ |
| C | ○ | Δ |
| M | Δ | ○ |

⊚: very good, ○: good, Δ: slightly good, X: bad

Table 3 shows that the soybean milk obtained by the present invention has a more excellent taste and flavor than the others.

EXAMPLE 3

One part by weight of dehulled and dehypocotyled soybeans were soaked in 10 parts by weight of water at a temperature of 90° C. to be impregnated sufficiently. A mixture of one part by weight of the impregnated soybeans and three parts by weight of hot water (90° C.) was subjected to a pulverizing treatment with certain combinations of COMITROL (URSCHEL), MASCULLOLLOIDER (MASUKO SANGYOU, Japan), chopper mill (MASUKO SANGYO, Japan), which has rotating blades, and line mill (TOKUSYUKIKA, Japan), which has rotating blades, specified in Table 4 to provide an aqueous slurry containing particles of 30–70 μm. Then, the obtained slurries were further ground twice with high-pressure homogenizer at 200 kg/cm² to provide particle size of 20–30 μm.

TABLE 4

| Pulverizing operation | |
| --- | --- |
| CCH | Comitrol → Comitrol → homogenizer |
| CMH | Comitrol → Masucolloider → homogenizer |

TABLE 4-continued

| | Pulverizing operation |
|---|---|
| MCH | Masucolloider → Comitrol → homogenizer |
| MMH | Masucolloider → Masucolloider → homogenizer |
| CLH | Comitrol → line mill → homogenizer |
| ChCH | chopper mill → Comitrol → homogenizer |
| ChMH | chopper mill → Masucolloider → homogenizer |

The obtained slurry, soybean milk and okara were evaluated as in the preceding Example. The results are shown in Table 5.

TABLE 5

| Pulverizing operation | Particle size of the slurry ($\mu$m) | Dried solids content of the slurry (%) | Weight ratio soybean milk: okara |
|---|---|---|---|
| CCH | 25.6 | 9.5 | 77:23 |
| CMH | 24.9 | 9.5 | 74:26 |
| MCH | 25.0 | 9.4 | 74:26 |
| MMH | 25.0 | 9.5 | 76:24 |
| CLH | 24.6 | 9.4 | 51:49 |
| ChCH | 26.9 | 9.5 | 44:56 |
| ChMH | 25.6 | 9.6 | 49:51 |

| Pulverizing operation | Dried solids content of the soybean milk (%) | Dried solids content of the okara (%) | Protein yield of the soybean milk (%) |
|---|---|---|---|
| CCH | 8.4 | 13.2 | 79.1 |
| CMH | 8.1 | 13.8 | 74.3 |
| MCH | 8.0 | 13.5 | 73.4 |
| MMH | 8.2 | 13.6 | 77.3 |
| CLH | 7.5 | 11.1 | 47.4 |
| ChCH | 5.8 | 12.9 | 31.6 |
| ChMH | 5.3 | 14.5 | 32.1 |

The soybean milks which showed good protein yield were CCH, CMH and MMH. When the pulverization step was effected with the chopper mill or line mill solely, the particle size of the soybeans couldn't be less than 100 $\mu$m. Therefore, after pulverizing with each of them, the soybean particles were cut with a COMITROL to provide the desired particle size. However, the obtained soybean milk did not show a good protein yield.

The soybean milks with good protein yields were evaluated by panelists. The results are shown in Table 6.

TABLE 6

| Pulverizing operation | Flavor | Taste |
|---|---|---|
| CCH | ⊙ | ⊙ |
| CMH | ○ | ⊙ |
| MCH | Δ | ⊙ |
| MMH | Δ | ⊙ |

⊙: very good, ○: good, Δ: slightly good, X: bad

According to Table 6, it is suggested that when pulverized first with MASCOLLOIDER, soybean cells are crushed and destroyed, and cellular enzymes may be activated to generate an unpleasant flavor.

Test 1

The saccharide contents of the CCH and MMH soybean milks obtained from Example 2 were analyzed.

Each of the soybean milks was adjusted to pH 4.5 with hydrochloric acid in order to precipitate the protein content, then centrifuged and the supernatant was freeze-dried to provide test samples. An analysis was carried out with 0.1% concentration of samples prepared by adding water to the freeze-dried supernatant. One ml of each sample was added with 2N trifluoro acetic acid (TFA) and hydrolyzed for 2 hours at 121° C. Then, TFA was removed by evaporation under reduced pressure and the remainder was added with 1 ml of water and 0.1 ml of 1% aqueous glycerol solution as an internal standard. The obtained sample was measured with HPLC under the following conditions:

Analysis of uronic acid and neutral saccharides
Column: Shodex Sugar SH-1821
Eluent: 0.001N sulfuric acid
Flow rate: 1 ml/min.
Detection: RI From the peak areas representing uronic acid and neutral saccharides against that of the internal standard, the saccharide concentration was determined.

Analysis of composition of the neutral saccharides
Column: TS Kgel Sugar AX-1
Eluent: 0.5M borate buffer containing 1% monoethanol amine (pH 7.8)
Flow rate: 0.4 ml/min.
Detection: UV 320 nm Results are shown in Table 7.

TABLE 7

| Operation | Rhamnose | Mannose | Fucose | mol % Galactose |
|---|---|---|---|---|
| CCH | 6.0 | 10.6 | 8.3 | 30.2 |
| MMH | 6.9 | 3.1 | 6.8 | 40.7 |

| Operation | Arabinose | Xylose | Glucose | Uronic acid |
|---|---|---|---|---|
| CCH | 18.6 | 9.2 | 13.6 | 3.5 |
| MMH | 20.4 | 5.1 | 7.2 | 9.8 |

According to these results, CCH soybean milk contains a large amount of glucose and a small amount of uronic acid, that is, the pectin like polysaccharide content of the CCH soybean milk is small. To the contrary, MMH soybean milk contains a relatively small amount of glucose and a large amount of uronic acid and rhamnose, that is, the pectin like polysaccharide content of the MMH soybean milk is relatively large. These results suggest that the process of the present invention can reduce contamination of pectin like polysaccharides, the main component of cell walls, in the soybean milk.

EXAMPLE 4

One part by weight of dehulled and dehypocotyled soybeans were soaked in 10 parts by weight of water at a temperature of 40° C. for more than 60 minutes to sufficiently impregnate with water. A mixture of one part by weight of the impregnated soybeans (water content was 50%) and three parts by weight of hot water (90° C.) was cut twice with COMITROL (URSCHEL) to provide an aqueous slurry containing soybean particles of 30–70 $\mu$m. Then, the obtained slurry was further ground twice with a high-pressure homogenizer (APV Co.) at 200 kg/cm$^2$ to provide an aqueous slurry containing soybean particles of 25 $\mu$m. The obtained slurry was centrifuged and separated into soybean milk and okara. An average particle size of the obtained okara was 25 $\mu$m. The particle size was determined by the COULTER counter method. The obtained okara was used for following use examples.

Use Example 1

Twenty grams of well mixed egg yolk (one egg yolk), 200 ml of water, 100 g of okara (not dried) of Example 4 and 160 g of flour were well blended to provide an okara batter. As a comparative example, commercially available not dried okara, of which the average particle size was 200 μm, was used instead the okara of Example 4 to provide a commercial okara batter. In addition, 20 g of egg yolk, 200 ml of water and 170 g of flour were well blended to provide a standard batter.

Shucked black-tiger prawns without heads were dipped in the above batters respectively and deep-fried at 180° C. for 3 minutes to provide fried prawns. The obtained batter and the fried prawns were evaluated. The results are shown in Table 8.

TABLE 8

| Batter | Standard | Commercial okara | Okara |
|---|---|---|---|
| Condition of the batter | standard | separated | standard |
| Fried prawns color | standard | almost standard | almost standard |
| Texture | standard | standard | tougher than standard |
| Taste | standard | standard | better than standard |

According to Table 8, the fried-prawns prepared with the okara batter of the present invention showed a good and crisp texture, a mild flavor, and a totally great taste without any sandy taste.

Use Example 2

Two hundred grams of well mixed whole eggs (four eggs), 800 ml of water, 400 g of the okara of Example 4 and 400 g of flour were blended to provide okonomiyaki (Japanese savory pancake) dough. As a comparative example, commercially available okara was used instead of the okara of Example 4. In addition, 200 g of egg, 400 ml of water and 400 g of flour were blended to provide standard okonomiyaki dough. Seventy grams of the respective dough was pan-broiled for about two minutes to provide okonomiyaki. The obtained okonomiyakis were evaluated immediately, one hour and two hours after cooking. The results are shown in Table 9.

TABLE 9

| | | Standard dough | Dough with commercially available okara | Dough with okara of Example 4 |
|---|---|---|---|---|
| State of the dough | | standard | less thickness | standard |
| Taste of the okonomiyaki evaluated after cooking | immediately | ○ | Δ sticky | ⊚ soft |
| | 1 hour | Δ sticky | Δ sticky | ⊚ |
| | 2 hours | X | Δ sticky | ⊚ |
| Flavor of the okonomiyaki evaluated after cooking | immediately | ○ | Δ | ○ |
| | 1 hour | ○ | Δ | ○ |
| | 2 hours | ○ | Δ | ○ |

⊚: very good with commercial value
○: good with commercial value
Δ: slightly bad without commercial value
X: very bad without commercial value According to the panelists, okonomiyaki obtained with the dough containing okara of the present invention had a pleasant soft and light taste even after standing for two hours.

What is claimed is:

1. A process for producing soybean milk and okara which comprises carrying out pulverization of soybeans impregnated with water by the steps of:

cutting impregnated soybeans with a device having rotating blade(s) which can cut the soybeans into particles of less than about 100 μm, to provide particles having an average diameter of less than about 100 μm, grinding the obtained soybean particles with a device which exerts frictional shearing stress to provide an aqueous soybean slurry, and separating the water-soluble portion of the slurry from the water-insoluble portion to provide soybean milk and okara.

2. The process of claim 1, wherein the average diameter of the particles obtained in the cutting step is about 20–100 μm, and the average diameter of the particles obtained in the grinding step is about 15–40 μm.

3. The process of claim 1, wherein one or both of the cutting step and the grinding step are effected twice or more.

* * * * *